US008663820B2

(12) United States Patent
Giering et al.

(10) Patent No.: US 8,663,820 B2
(45) Date of Patent: Mar. 4, 2014

(54) SECURITY DOCUMENT WITH LUMINESCENT TRANSITION METAL DOPING

(75) Inventors: Thomas Giering, Kirchseeon (DE); Rainer Hoppe, Nuremberg (DE); Fritz Stahr, Penzberg (DE)

(73) Assignee: Giesecke & Devrient GmbH, Munich (DE)

( * ) Notice: Subject to any disclaimer, the term of this patent is extended or adjusted under 35 U.S.C. 154(b) by 1976 days.

(21) Appl. No.: 10/471,060

(22) PCT Filed: Mar. 5, 2002

(86) PCT No.: PCT/EP02/02405

§ 371 (c)(1),
(2), (4) Date: Jan. 15, 2004

(87) PCT Pub. No.: WO02/070279

PCT Pub. Date: Sep. 12, 2002

(65) Prior Publication Data

US 2004/0105962 A1 Jun. 3, 2004

(30) Foreign Application Priority Data

Mar. 8, 2001 (DE) .................................. 101 11 116

(51) Int. Cl.
*B32B 9/00* (2006.01)

(52) U.S. Cl.
USPC ............ 428/690; 428/211.1; 428/67; 283/92; 283/901; 106/453; 106/451; 106/439; 106/436; 106/428; 106/733; 106/769; 106/31.14; 250/458.1; 252/301.36; 252/301.4 R; 252/301.16; 252/301.4 S; 252/646; 252/301.17; 252/301.18; 252/301.21; 252/301.33

(58) Field of Classification Search
USPC .......... 252/301.4 R, 301.36, 301.16, 301.4 S, 252/646, 301.17, 301.18, 301.21, 301.33; 428/690, 211.1, 67; 283/92, 901; 106/453, 451, 439, 436, 428, 733, 769, 106/31.14; 250/458.1, 301.6, 301.4 R, 250/301.4 H, 301.4 P, 301.4 F, 301.6 R, 250/601.6 P
See application file for complete search history.

(56) References Cited

U.S. PATENT DOCUMENTS 3,627,692 A * 12/1971 Ohlmann et al. ....... 252/301.4 P
3,800,142 A * 3/1974 Harshaw, II ................. 250/337

(Continued)

FOREIGN PATENT DOCUMENTS

WO WO 99/38700 A1 8/1999
WO WO 99/38702 A1 8/1999
WO WO 00/27645 A1 5/2000

OTHER PUBLICATIONS www.sciencedirect.com featuring Journal of Luminescence, vol. 108, Issues 1-4, Jun. 2004, excerpt entitled: "Photoinduced melting of the orbital order in a perovskite-type vanadate LaVO3".*

(Continued)

*Primary Examiner* — D. Lawrence Tarazano
*Assistant Examiner* — Tamra L Dicus
(74) *Attorney, Agent, or Firm* — Rothwell, Figg, Ernst & Manbeck

(57) ABSTRACT

The invention relates to a printed document of value having at least one authenticity feature in the form of a luminescent substance based on doped host lattices. The host lattice has a strong crystal field and is doped with at least one chromophore with the electron configuration $(3d)^2$.

35 Claims, 1 Drawing Sheet

(56) References Cited

U.S. PATENT DOCUMENTS

| | | | | | |
|---|---|---|---|---|---|
| 4,451,521 | A * | 5/1984 | Kaule et al. | 428/199 |
| 4,452,843 | A * | 6/1984 | Kaule et al. | 428/199 |
| 4,598,205 | A * | 7/1986 | Kaule et al. | 250/458.1 |
| 4,853,354 | A * | 8/1989 | Calvat et al. | 501/119 |
| 5,507,976 | A * | 4/1996 | Bringley et al. | 252/301.4 H |
| 5,651,615 | A * | 7/1997 | Hurier | 283/92 |
| 6,149,862 | A * | 11/2000 | Gliklad et al. | 420/83 |
| 6,203,069 | B1 * | 3/2001 | Outwater et al. | 283/88 |
| 6,210,605 | B1 * | 4/2001 | Srivastava et al. | 252/301.4 R |
| 6,373,184 | B1 * | 4/2002 | Suh et al. | 313/486 |
| 6,383,618 | B1 * | 5/2002 | Kaule et al. | 428/195.1 |
| 6,402,987 | B1 * | 6/2002 | Srivastava et al. | 252/301.4 R |
| 6,404,788 | B1 * | 6/2002 | Choi et al. | 372/39 |
| 6,479,133 | B1 * | 11/2002 | Kaule et al. | 428/195.1 |
| 6,572,784 | B1 * | 6/2003 | Coombs et al. | 252/301.16 |
| 6,610,315 | B2 * | 8/2003 | Scholz et al. | 424/405 |
| 6,669,868 | B2 * | 12/2003 | Yu et al. | 252/301.4 F |
| 6,690,705 | B2 * | 2/2004 | Maksimov et al. | 372/69 |
| 6,712,993 | B2 * | 3/2004 | Kijima et al. | 252/301.4 R |
| 6,828,718 | B2 * | 12/2004 | You et al. | 313/486 |
| 6,866,710 | B2 * | 3/2005 | Heider et al. | 106/403 |
| 6,899,824 | B2 * | 5/2005 | Meyer et al. | 252/299.64 |
| 7,029,602 | B2 * | 4/2006 | Oshio | 252/301.4 R |
| 2002/0121627 | A1 * | 9/2002 | Yu et al. | 252/301.4 F |

OTHER PUBLICATIONS

Hawley's Condensed Chemical Dictionary, Thirteenth edition, published by John Wiley & Sons, Inc. 1997, p. 619 definition of iron.*
CRC Handbook of Chemistry and Physics 63rd edition 1982-1983, Periodic Table of the Elements.*
"Ferrate(VI), a Novel Near-Infrared Luminophore", by Markus Herren and Hans U. Gudel, Inorganic Chemistry, Sep. 2, 1992, vol. 31, No. 18.*
http://www.ferrate.eu/index_en.php?bal=0&m=.*
http://chemed.chem.purdue.edu/genchem/topicreview/bp/ch2/names.html.*
"Excited States of Titanium(2+):Sharp-Band and Broad-Band Near-Infrared Luminescence from Ti2+ in MgCl2 and MgBr2" by S. Jacobsen et al., Journal of Luminescence 65 (1996) 293-301.*
"MnO43-Nir luminescence in Ba2SiO4" by L.C. Ferracin, Journal of Luminescence 72-74 (1997) 185-187.*
"Excited state properties of ferrate(VI) doped crystals of K2SO4 and K2C04" by T. Brunolda et al. J. Am. Chem. Soc. 1988, 110, 7610-7616.*
"Prediction of apatite lattice constants from their constituent elemental radii and artificial intelligence methods", by P. Wu, Institute of High Performance Computing, 1 Science Park Road, 01-01 the Capricorn, Singapore Science Park II, Singapore 117528, Singapore Received Mar. 7, 2003; accepted Jul. 22, 2003.*
http://chemed.chem.purdue.edu/genchem/topicreview/bp/ch12/trans.php.*
http://www.ptable.com.*
"Photo-Lumineszenz und Magneto Optik einiger Ubergangsmetall-lonen," Lehr, Wissenschaftliche Schriftenreihe Physik, 1994.
"Kinetic and Electronic Energy Dependence of the Reactions of Sc+ and T+ with D2O," Chen et al., J. Chem. Phys. vol. 98, No. 44, 1994, pp. 11490-11498.
"Reaction of Sc+, Ti+ and V+ with CO.MC+ and MO+ bond energies," Clemmer et al., J. Chem. Phys. vol. 95, No. 5, 1991, pp. 3387-3393.
"Luminescent Materials," Ullmann's Encyclopedia of Industrial Chemistry, Wiley-VCH, Online Posting Date: Jun. 15, 2000.
"Principle phosphor materials and their optical properties," Tamatani, M. Phosphor Handbook, Chapter 3 Section 2, CRC Press, 1998.
"Other phosphors," Suzuki, Phosphor Handbook, Chapter 12 Sections 3-5, Chapter 13 Sections 5-7 CRC Press, 1998, pp. 659-663, 672-679 •.
Farbe und Lumineszenz von Mineralien, Steffen, Gabriele, Stuttgart, Enke im Georg-Thieme-Verlag, 2000, pp. 105-120.
Herren et al., "High-resolution near-infrared luminescence of manganese(V) in tetrahedral oxo coordination," Chemical Physics Letters, vol. 183, No. 1,2, Aug. 23, 1991 p. 98-102.
"Colour, luminescence and bonding properties of tetrahedrally coordinated chromium(IV), maganese(V) and iron(VI) . . ." Reinen et al., J. Alloys and Compounds 246(1997) p. 193-208.
"Luminscence of transition metal ions in unusual oxidation states," Gudel et al., Electrochemical Society Proceedings, vol. 97-29, 1998, pp. 225-234.

* cited by examiner

SECURITY DOCUMENT WITH LUMINESCENT TRANSITION METAL DOPING

BACKGROUND

This invention relates to a printed document of value having at least one authenticity feature in the form of a luminescent substance based on host lattices doped with chromophores with the electron configuration $(3d)^2$.

The term "document of value" refers according to the invention to bank notes, checks, shares, tokens, ID cards, credit cards, passports and other documents as well as labels, seals, packages or other elements for product protection.

Protecting documents of value against forgery by means of luminescent substances has been known for some time. The use of rare earth metals has also been discussed in this context. They have the advantage of having narrow-band characteristic spectral lines that facilitate reliable detection and delimitation over other spectra. The substances preferably used have either absorption or emission outside the visible spectral region.

If the emissions are at wavelengths between about 400 nanometers and about 700 nanometers, the luminescent substances are detectable with the eye upon suitable excitation. This is desirable for some applications, e.g. for an authenticity check by illumination with UV light. For other applications, however, it is of advantage if the emission is outside the visible spectral region since special detectors are then necessary for detecting the substances.

Luminophores with characteristic properties that are suitable for protecting documents of value and in particular for automatic authenticity detection are limited in number, however. Most inorganic and organic luminophores have uncharacteristic, broad spectra and are moreover often commercially available. This impedes their identification and makes it impracticable to use several of said substances simultaneously.

SUMMARY OF THE INVENTION

Starting out from this prior art, the invention is based on the problem of increasing the number of luminophores suitable as an authenticity marking for documents of value and in particular providing documents of value with authenticity features in the form of luminescent substances that differ from documents of value with hitherto known luminophores by a characteristically altered excitation and/or emission spectrum.

The solution to this problem can be found in the independent claims. Developments are the subject matter of the subclaims.

The invention is based on the finding that the difficult detectability of certain luminescences with increasing emission wavelength in the IR spectral region can be utilized very advantageously to increase the protection from forgery.

DETAILED DESCRIPTION OF THE INVENTION

Figure 1A:
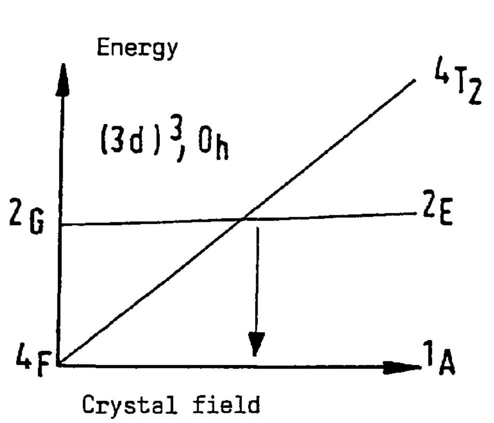
FIG. 1*a* shows how the position and succession of the electron levels of the chromophore $Cr^{3+}$ depend on the strength of the crystal field.

According to the invention, documents of value are protected using at least one luminescent substance whose emission spectrum is outside the visible spectral region, preferably even outside the responsiveness of silicon detectors.

The substances suitable for the inventive authenticity protection are luminescent substances based on host lattices doped with chromophores with the electron configuration $(3d)^2$. These may be chromophores of one kind or a mixture of at least two different chromophores. The inventive chromophores are preferably the transition metals titanium in oxidation state $Ti^{2+}$, hereinafter Ti(II), vanadium in oxidation state $V^{3+}$, hereinafter V(III), chromium in oxidation state $Cr^{4+}$, hereinafter Cr(IV), manganese in oxidation state $Mn^{5+}$, hereinafter Mn(V), and iron in oxidation state $Fe^{6+}$, hereinafter Fe(VI).

The host lattices are inorganic matrices or organic chelates, e.g. apatites, spodiosites, palmierites, forsterite, brushites, dahllites, ellestadites, francolites, monetites, morinites, whitlockites, wilkeites, voelckerites, pyromorphites, garnets, perovskites, olivines and certain silicates, titanates, vanadates, phosphates, sulfates, aluminates, zirconates.

Preferably, the host lattice is a compound with the formula:

$$[Ba_aCa_bSr_cPb_dCd_e(P_fV_gAs_hSi_jS_kCr_lO_4)_3F_mCl_nBr_p(OH)_q]_x,$$

where
$a+b+c+d+e=5$;
$f+g+h+j+k+l=1$;
$m+n+p+q=1$;
$x=1$ or 2; and
a, b, c, d, e each range from 0 to 5; and
f, g, h, j, k, l, m, n, p, q from 0 to 1.

A further preferred host lattice is a compound with the formula:

$$[Mg_aBa_bCa_cSr_dPb_eCd_f][P_gV_hAs_jSi_kS_lCr_m]O_4[F_nCl_pBr_q(OH)_r],$$

where $a+b+c+d+e+f=2$;
$g+h+j+k+l+m=1$;
$n+p+q+r=1$; and
a, b, c, d, e, f each range from 0 to 2; and
g, h, j, k, l, m, n, p, q, r from 0 to 1.

A further suitable host lattice is a compound with the formula:

$$[Mg_aBa_bCa_cSr_dPb_eCd_f][Si_gTi_hGe_j]O_4,$$

where $a+b+c+d+e+f=2$;
$g+h+j=1$; and
a, b, c, d, e, f each range from 0 to 2, and
g, h, j from 0 to 1.

In addition a host lattice with the formula:

$$[Li_aNa_bK_cRb_d][P_eAs_fV_g]O_4,$$

is preferred, where $a+b+c+d=3$;
$e+f+g=1$; and
a, b, c, d each range from 0 to 3, and
e, f, g from 0 to 1.

Further, a particularly suitable host lattice has the formula:

$$[Y_aLa_b][Si_cTi_d]O_5,$$

where $a+b=2$;
$c+d=1$; and
a, b each range from 0 to 2, and
c, d from 0 to 1.

Preferably, the host lattice is further a compound with the formula:

$$[Ba_aCa_bSr_cPb_dCd_e](P_fV_gAs_hSi_jS_kCr_lO_4)_2,$$

where a+b+c+d+e=3;
f+g+h+j+k+l=1; and
a, b, c, d, e each range from 0 to 3, and
f, g, h, j, k, l from 0 to 1.

Also preferred is a host lattice with the formula:

$$[Ba_aCa_bSr_cPb_dCd_e](P_fV_gAs_hSi_jS_kCr_lO_4)_3Cl,$$

where a+b+c+d+e=5;
f+g+h+j+l=1; and
a, b, c, d, e each range from 0 to 5, and
f, g, h, j, k, l from 0 to 1.

In addition, a particularly suitable host lattice has the formula:

$$[Na_aK_bRb_cCs_d][S_eSe_fCr_gMo_h]O_4,$$

where a+b+c+d=2;
e+f+g+h=1; and
a, b, c, d each range from 0 to 2, and
e, f, g, h from 0 to 1.

In addition, a particularly suitable host lattice has the formula:

$$[Mg_aCa_bSr_cBa_d][S_eSe_fCr_gMo_hW_i]O_4,$$

where a+b+c+d=1; and
e+f+g+h+i=1, and
a, b, c, d each range from 0 to 1, and
e, f, g, h, i from 0 to 1. The host lattice Ba $SO_4$ is especially preferred.

A further preferred host lattice is a compound with the formula:

$$[Sc_aY_bLa_cCe_dPr_eNd_fPm_gSm_hEu_jGd_kTb_lDy_mHo_nEr_pTm_qYb_rLn_s][Al_uFe_vCr_x]O_3,$$

where
a+b+c+d+e+f+g+h+j+k+l+m+n+p+q+r+s=1;
u+v+x=1; and
a, b, c, d, e, f, g, h, j, k, l, m, n, p, q, r, s, u, v, x each range from 0 to 1.

In addition a host lattice with the formula:

$$[Y_aGd_bSc_cLa_dLn_e][Al_fFe_gCr_h]O_{12}$$

is preferred, where a+b+c+d+e=3;
f+g+h=5; and
a, b, c, d, e each range from 0 to 3, and
f, g, h from 0 to 5.

A further preferred host lattice is a compound with the formula:

$$[Mg_aCa_bSr_cBa_d][Al_eCr_fFe_gGa_h]O_4,$$

where
a+b+c+d=1;
e+f+g+h=2; and
a, b, c, d each range from 0 to 1, and
e, f, g, h from 0 to 2
or a compound with the formula $$[Mg_aCa_bSr_cBa_d][Al_eCr_fFe_gGa_h]O_7,$$

where
a+b+c+d=1;
e+f+g+h=4; and
a, b, c, d each range from 0 to 1, and
e, f, g, h from 0 to 4.

Also preferred is a host lattice with the formula $$Y_2[Si_aTi_bZr_c]O_7 \text{ or } MgCa_2[Si_aTi_bZr_c]O_7,$$

where a+b+c=2, and
a, b and c each range from 0 to 2.

A further suitable host lattice is a compound with the formula $$[Ba_aCa_bSr_c][Si_dTi_eZr_f]O_5,$$

where
a+b+c=3;
d+e+f=1; and
a, b, c each range from 0 to 3 and
d, e, f from 0 to 1.

Further, a host lattice with the formula $$[Y_aLa_bZr_c][P_dSi_e]O_4 \text{ is preferred,}$$

where
a+b+c=1;
d+e=1, and
a, b, c each range from 0 to 1,
d, e from 0 to 1.

Y $PO_4$, La $PO_4$, Zr Si $O_4$ is especially preferred.

Further, a host lattice with the formula $$K[Ti_{2a}Zr_{2b}](PO_4)_3 \text{ is preferred,}$$

where
a+b=1, and
a, b each range from 0 to 1.

K $Ti_2(PO_4)_3$, K $Zr_2(PO_4)_3$ is especially preferred.

Host lattices with a strong crystal field are in particular preferred.

The positions and shapes of the excitation and/or emission bands are dependent on the insertion position of the chromophores in the host lattice. The chromophores can be present in the oxidic structural units of the host lattice both in the tetrahedral and in the octahedral configuration. However, the tetraoxo configuration in the host lattice is preferred. In addition, the positions and shapes of the excitation and/or emission bands depend on the strength of the crystal field in the host lattice. The interactions occurring between chromophore and host lattice cause the electronic levels of the chromophores to change relative to their values and arrangement in the gas phase, i.e. to shift (in part mutually).

Figure 1B:
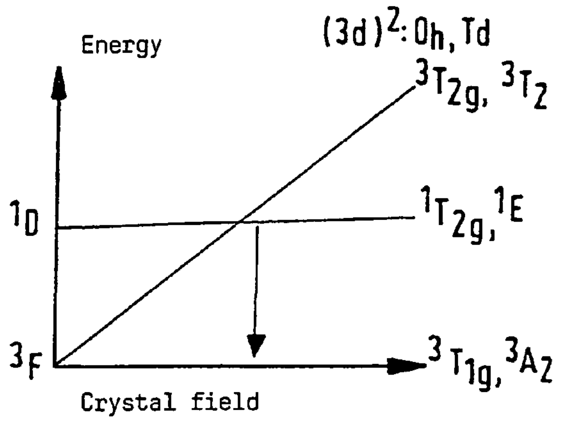
FIG. 1*b* shows an energy diagram as in FIG. 1*a* for invention $(\mathbf{3d})^2$ configuration (octahedral $(O_h)$ and tetrahedral $(T_d)$ configuration).

The concept of the crystal field will be explained by the example of the system $Cr^{3+}$ in an octahedral environment [Imbusch, G. F.; Spectroscopy of Solid-State Laser-Type Materials, Ed: B. Di Bartolo; p 165; 1987]. FIG. 1*a* shows how the position and succession of the electronic levels of the chromophore $Cr^{3+}$ depend on the strength of the crystal field, i.e. the interaction between chromophore and lattice (Tanabe-Sugano diagram). For weak octahedral crystal fields, the electronic state $^4T_2$ is the first excited state above the ground state $^4A_2$, a broad-band luminescence from level $^4T_2$ is observed. For strong crystal fields, finally, the state $^2E$ weakly dependent on the crystal field is the first excited electronic state and a narrow-band emission from this level is observed. Analogous energy diagrams can be formulated for the inventive $(3d)^2$ configuration with the corresponding designations of the levels. For the important octahedral ($O_h$) and tetrahedral ($T_d$) configuration the level sequence is shown in FIG. 1*b*.

For protecting documents of value both broad-band and narrow-band luminescence can be used, but for reasons of selectivity narrow-band luminescence is preferred. These are observed in particular from the chromophores Mn(V) and Fe(VI) in host lattices with a strong crystal field.

Narrow band emission is usually spoken of when the bands occurring in the emission spectrum show an average half-value width of less than 50 nanometers. However, this does not mean that bands having a half-value width outside this range do not solve the inventive problem.

Varying and combining the inventive chromophores and varying the host lattices open up numerous possibilities for influencing the excitation and emission spectra of the inventive luminescent substances and thus producing a great number of security features. Not only the evaluation of the excitation and/or emission spectra can be used for differentiation but also the lifetime of luminescence. The evaluation can take account of not only the wavelengths of the excitation or emission lines but also their number and/or shape and/or intensities, so that any desired coding can be represented.

The number of distinguishable inventive substances can be further increased if mixed crystals of the host lattices are also permitted or the host lattices are varied with additional dopings. For example, apatites and spodiosites or garnets and perovskites in certain concentration ratios of the starting substances can form mixed crystals in which the lattices run into one another. Connected therewith the crystal field acting on the chromophore can be changed.

Likewise, it is possible to incorporate further chromophores into the host lattices in addition to the inventive chromophores by doping and thus obtain combined luminescence of both systems or an energy transfer between the systems and utilize it for identification. For example, rare earth ions that maintain their typical luminescence in the host lattice due to their shielded shells are suitable for this purpose. These are preferably neodymium (Nd), holmium (Ho), erbium (Er), thulium (Tm) or ytterbium (Yb) cations or mixtures thereof.

If the document of value is marked not with one but with several of the inventive luminescent substances, the number of distinguishable combinations can be increased further. If different mixture ratios are moreover distinguished, the number of combinations can be increased again. Marking can be effected either at different places on the document of value or at the same place. If the luminescent substance is applied or incorporated at different places on the document of value, a spatial code, in the simplest case e.g. a bar code, can be produced in this way.

Further, the forgery-proofness of the document of value can be increased by linking the special chosen luminescent substance e.g. in a document of value with other information of the document of value so that a check by means of a suitable algorithm is possible. The document of value can of course have further additional authenticity features, such as classic fluorescence and/or magnetism, besides the inventive luminescent substance.

The luminescent substances can be incorporated into the document of value in a great variety of ways according to the invention. Thus, the luminescent substances can be incorporated into a printing ink for example. It is also possible to admix the luminescent substance to the paper pulp or plastic composition during production of a document of value based on paper or plastic. Likewise, the luminescent substances can be provided on or in a plastic carrier material, which can for example be again embedded at least partly into the paper pulp. The carrier material, which is based on a suitable polymer, such as PMMA, and into which the inventive luminescent substance is embedded, can have the form of a security thread, a mottling fiber or a planchet. Likewise, for product protection the luminescent substance can be incorporated e.g. directly into the material of the object to be protected, e.g. into housings and plastic bottles.

However, the plastic or paper carrier material can also be fastened to any other object, e.g. for product protection. The carrier material is in this case preferably designed in the form of a label. If the carrier material is part of the product to be protected, as is the case e.g. with tear threads, any other design is of course also possible. It can be expedient in certain cases of application to provide the luminescent substance on the document of value as an invisible coating. It can be present all over or else in the form of certain patterns, such as stripes, lines, circles or in the form of alphanumeric characters. To guarantee the invisibility of the luminescent substance, either a colorless luminescent substance must, according to the invention, be used in the printing ink or coating lacquer or a colored luminescent substance used in such low concentration that the transparency of the coating is just given. Alternatively or additionally, the carrier material can be already colored suitably so that colored luminescent substances are not perceived due to their inherent color.

Usually, the inventive luminescent substances are processed in the form of pigments. For better processing or to increase their stability, the pigments can be present in particular as individually encapsulated pigment particles or be covered with an inorganic or organic coating. For example, the individual pigment particles are surrounded with a silicate sheath and can thus be more easily dispersed in media. Likewise, different pigment particles of a combination can be encapsulated jointly, e.g. in fibers, threads, silicate sheaths. Thus, it is e.g. no longer possible to change the "code" of the combination subsequently. "Encapsulation" refers here to complete encasing of the pigment particles, while "coating" includes partial encasing or covering of the pigment particles.

Hereinafter, some examples of the inventive luminescent substance will be explained in more detail.

EXAMPLE 1

For the preparation the starting substances in oxidic form or substances that can be converted into oxides are mixed in a suitable ratio, e.g. as in equation (1), provided with the chromophore and then annealed, crushed, washed (e.g. with water), dried and ground. The chromophores used can be e.g. $Mn_2O_3$, MnO, $MnO_2$, $MnCO_3$, $MnCl_2$, $KMnO_4$ and organic manganese compounds. Their weight fraction based on the total mixture can be up to 20 percent by weight. Annealing is effected in the temperature range from 200 to 1700° C. and a holding time of 0.2 to 24 hours, but preferably at 300 to 500° C. and a holding time from 0.5 to 2 hours.

$$6LiOH+As_2O_5+xMnCl_2\rightarrow 2Li_3AsO_4:Mn+3H_2O+xCl_2 \quad (1)$$

To shift equilibrium in the direction of product formation, the preparation can additionally be mixed with $LiCO_3$, preferably 1 to 5 percent, and additional LiOH, preferably 1 to 20 percent by weight.

EXAMPLE 2

Suitable quantities of sulfates (e.g. $K_2SO_4$) or chromates (e.g. $K_2CrO_4$) and the quantity of dopant, e.g. $Na_2FeO_4$, are dissolved in an alkaline medium. The doping with $Na_2FeO_4$ can be up to 20 percent. Vaporization of the solvent yields the product, which is ground for further use.

Alternatively, a solid-state reaction can also be performed. For this purpose, $K_2SO_4$ is ground with NaCl and intimately mixed with $Fe_3O_4$. The mixture is then annealed at temperatures between 700 and 1800° C. The product is ground for further use.

EXAMPLE 3

The method described in Example 2 can be altered so that a spray dryer is used for vaporizing the solvent. Further, the alkaline medium can consist completely or partly e.g. of a silicate suspension (e.g. LUDOX® AS-40, Dupont). In this case a material encased with silicate is obtained upon spray drying. A subsequent annealing process, preferably at temperatures from 200° C. to 600° C., produces a $SiO_2$ protective layer and stabilizes the substance with respect to solubility in water. Additionally the material can be embedded into a polymer, e.g. PMMA, and processed into foil material. This is then cut into planchets.

Further embodiments and advantages of the invention will be explained hereinafter with reference to FIG. 2.

Figure 2:
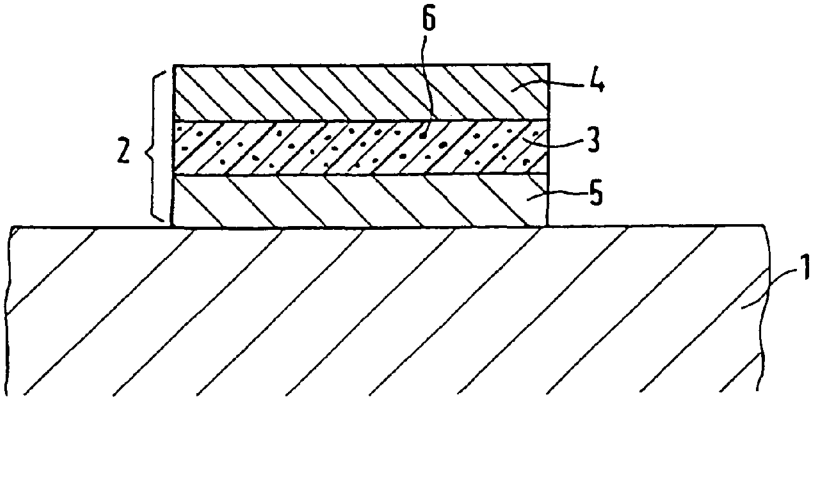
FIG. 2 shows an inventive security element in cross section.

FIG. 2 shows an inventive security element in cross section.

FIG. 2 shows an embodiment of the inventive security element. The security element consists in this case of label 2 composed of paper or plastic layer 3, transparent cover layer 4 and adhesive layer 5. Label 2 is connected via adhesive layer 5 with any desired substrate 1. Substrate 1 may be a document of value, ID card, passport, certificate or the like, or another object to be protected, for example CD, package or the like. Luminescent substance 6 is contained within the volume of layer 3 in this example.

Alternatively, the luminescent substance might also be contained in a printing ink (not shown) that is printed on one of the label layers, preferably on the surface of layer 3.

Instead of providing the luminescent substance in or on a carrier material that is then fastened to an object as a security element, it is also possible according to the invention to provide the luminescent substance directly in the document of value to be protected or on the surface thereof in the form of a coating.

The invention claimed is:

1. A document of value having at least one authenticity feature in the form of a luminescent substance including a host lattice doped with at least one transition metal ion having an electron configuration of $3d^2$, said transition metal ion being a luminescence emitter.

2. A document of value according to claim 1, wherein the host lattice has a strong crystal field.

3. A document of value according to claim 1, wherein the transition metal ion is titanium in oxidation state 2 or vanadium in oxidation state 3 or chromium in oxidation state 4 or manganese in oxidation state 5 or iron in oxidation state 6.

4. A document of value according to claim 1, wherein the document of value consists of paper or plastic.

5. A document of value according to claim 1, wherein the authenticity feature is incorporated into the volume of the document of value or present in a layer applied to the document of value.

6. A document of value according to claim 1, wherein the luminescent substance is provided on the document of value as an invisible, at least partial coating.

7. A document of value according to claim 1, wherein the luminescent substance is admixed to a printing ink.

8. A document of value according to claim 1, wherein the coating has the form of one or more stripes.

9. A document of value according to claim 1, wherein the host lattice is additionally codoped with at least one representative from the group of rare earth metal cations.

10. A document of value according to claim 9, wherein the rare earth metal cation is selected from neodymium (Nd), holmium (Ho), erbium (Er), thulium (Tm) and ytterbium (Yb).

11. A document of value according to claim 1, wherein the host lattice is selected from the class of apatites, spodiosites, palmierites, forsterites, brushites, dahllites, ellestadites, francolites, monetites, morinites, whitlockites, wilkeites, voelckerites, pyromorphites, garnets, perovskites, silicates, titanates, vanadates, phosphates.

12. A document of value according to claim 1, wherein the host lattice is a compound with the formula:

$$[Ba_aCa_bSr_cPb_dCd_e(P_fV_gAs_hSi_jS_kCr_lO_4)_3F_mCl_nBr_p(OH)_q]_x,$$

where
a+b+c+d+e=5;
f+g+h+j+k+l=1;
m+n+p+q=1;
x=1 or 2; and
a, b, c, d, e each range from 0 to 5; and
f, g, h, j, k, l, m, n, p, q from 0 to 1.

13. A document of value according to claim 1, wherein the host lattice is a compound with the formula:

$$[Mg_aBa_bCa_cSr_dPb_eCd_f][P_gV_hAs_jSi_kS_lCr_m]O_4[F_nCl_pBr_q(OH)_r],$$

where
a+b+c+d+e+f=2;
g+h+j+k+l+m=1;
n+p+q+r=1; and
a, b, c, d, e, f each range from 0 to 2; and
g, h, j, k, l, m, n, p, q, r from 0 to 1.

14. A document of value according to claim 1, wherein the host lattice is a compound with the formula:

$$[Mg_aBa_bCa_cSr_dPb_eCd_f][Si_gTi_hGe_j]O_4,$$

where
a+b+c+d+e+f=2;
g+h+j=1; and
a, b, c, d, e, f each range from 0 to 2, and
g, h, j from 0 to 1.

15. A document of value according to claim 1, wherein the host lattice is a compound with the formula:

$$[Li_aNa_bK_cRb_d][P_eAs_fV_g]O_4,$$

where
a+b+c+d=3;
e+f+g=1; and
a, b, c, d each range from 0 to 3, and
e, f, g from 0 to 1.

16. A document of value according to claim 1, wherein the host lattice is a compound with the formula:

$$[Y_aLa_b][Si_cTi_d]O_5,$$

where
a+b=2;
c+d=1; and
a, b each range from 0 to 2, and
c, d from 0 to 1.

17. A document of value according to claim 1, wherein the host lattice is a compound with the formula:

$$[Ba_aCa_bSr_cPb_dCd_e](P_fV_gAs_hSi_jS_kCr_lO_4)_2,$$

where
a+b+c+d+e=3;
f+g+h+j+k+l=1; and
a, b, c, d, e each range from 0 to 3, and
f, g, h, j, k, l from 0 to 1.

18. A document of value according to claim 1, wherein the host lattice is a compound with the formula:

$$[Ba_aCa_bSr_cPb_dCd_e](P_fV_gAs_hSi_jS_kCr_lO_4)_3Cl,$$

where
a+b+c+d+e=5;

f+g+h+j+1=1; and a, b, c, d, e each range from 0 to 5, and f, g, h, j, k, l from 0 to 1.

19. A document of value according to claim 1, wherein the host lattice is a compound with the formula:

$$[Na_aK_bRb_cCs_d][S_eSe_fCr_gMo_h]O_4,$$

where a+b+c+d=2;

e+f+g+h=1; and a, b, c, d each range from 0 to 2, and e, f, g, h from 0 to 1.

20. A document of value according to claim 1, wherein the host lattice is a compound with the formula:

$$[Mg_aCa_bSr_cBa_d][S_eSe_fCr_gMo_hW_i]O_4,$$

where a+b+c+d=1; and e+f+g+h+i=1, and a, b, c, d each range from 0 to 1, and e, f, g, h, i from 0 to 1.

21. A document of value according to claim 1, wherein the host lattice is a compound with the formula:

$$[Sc_aY_bLa_cCe_dPr_eNd_fPm_gSm_hEu_jGd_kTb_lDy_mHo_nEr_pTm_qYb_rLn_s][Al_uFe_vCr_x]O_3,$$

where a+b+c+d+e+f+g+h+j+k+l+m+n+p+q+r+s=1;

u+v+x=1; and a, b, c, d, e, f, g, h, j, k, l, m, n, p, q, r, s, u, v, x each range from 0 to 1.

22. A document of value according to claim 1, wherein the host lattice is a compound with the formula:

$$[Y_aGd_bSc_cLa_dLn_e][Al_fFe_gCr_h]O_{12}$$

where a+b+c+d+e=3;

f+g+h=5; and a, b, c, d, e each range from 0 to 3, and f, g, h from 0 to 5.

23. A document of value according to claim 1, wherein the host lattice is a compound with the formula:

$$[Mg_aCa_bSr_cBa_d][Al_eCr_fFe_gGa_h]O_4,$$

where a+b+c+d=1;

e+f+g+h=2; and a, b, c, d each range from 0 to 1, and e, f, g, h from 0 to 2 or a compound with the formula $$[Mg_aCa_bSr_cBa_d][Al_eCr_fFe_gGa_h]O_7,$$

where a+b+c+d=1;

e+f+g+h=4; and a, b, c, d each range from 0 to 1, and e, f, g, h from 0 to 4.

24. A document of value according to claim 1, wherein the host lattice is a compound with the formula $$Y_2[Si_aTi_bZr_c]O_7 \text{ or } MgCa_2[Si_aTi_bZr_c]O_7,$$

where a+b+c=2, and a, b and c each range from 0 to 2.

25. A document of value according to claim 1, wherein the host lattice is a compound with the formula $$[Ba_aCa_bSr_c][Si_dTi_eZr_f]O_5,$$

where a+b+c=3;

d+e+f=1; and a, b, c each range from 0 to 3 and d, e, f from 0 to 1.

26. A document of value according to claim 1, wherein the host lattice is a compound with the formula $$[Y_aLa_bZr_c][P_dSi_e]O_4,$$

where a+b+c=1;

d+e=1, and a, b, c each range from 0 to 1, d, e from 0 to 1.

27. A document of value according to claim 1, wherein the host lattice is a compound with the formula:

$$K[Ti_{2a}Zr_{2b}](PO_4)_3,$$

where a+b=1, and a, b each range from 0 to 1.

28. A document of value according to claim 1, wherein the transition metal ions are present in the host lattice in a tetraoxo configuration.

29. A document of value according to claim 1, wherein the luminescent substance is present as pigment particles.

30. A security element having a carrier material and at least one luminescent substance including a host lattice doped with at least one transition metal ion having an electron configuration of $3d^2$, said transition metal ion being a luminescence emitter.

31. A security element according to claim 30, wherein the host lattice has a strong crystal field.

32. A security element according to claim 30, wherein the security element has the form of a stripe or band.

33. A security element according to claim 30, wherein the carrier material is formed as a security thread, planchet or mottling fiber.

34. A security element according to claim 30, characterized in that the security element is formed as a label.

35. A security element according to claim 30, characterized in that the at least one luminescent substance is embedded in the carrier material or applied to the carrier material.

* * * * *

UNITED STATES PATENT AND TRADEMARK OFFICE

CERTIFICATE OF CORRECTION

PATENT NO. : 8,663,820 B2
APPLICATION NO. : 10/471060
DATED : March 4, 2014
INVENTOR(S) : Giering et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2122 days.

Signed and Sealed this
Twenty-ninth Day of September, 2015

Michelle K. Lee
*Director of the United States Patent and Trademark Office*